(12) United States Patent
Lin

(10) Patent No.: US 7,796,827 B2
(45) Date of Patent: Sep. 14, 2010

(54) FACE ENHANCEMENT IN A DIGITAL VIDEO

(75) Inventor: Qian Lin, Santa Clara, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1427 days.

(21) Appl. No.: 10/999,282

(22) Filed: Nov. 30, 2004

(65) Prior Publication Data

US 2006/0115172 A1 Jun. 1, 2006

(51) Int. Cl.
*G06K 9/42* (2006.01)
(52) U.S. Cl. .................... 382/260; 382/224; 348/207.2
(58) Field of Classification Search ................ 382/254, 382/224; 348/207.2
See application file for complete search history.

(56) References Cited

U.S. PATENT DOCUMENTS

| | | | |
|---|---|---|---|
| 4,825,391 A * | 4/1989 | Merz | 345/589 |
| 5,063,603 A | 11/1991 | Burt | |
| 5,208,872 A * | 5/1993 | Fisher | 382/300 |
| 5,309,228 A | 5/1994 | Nakamura | |
| 5,805,745 A | 9/1998 | Graf | |
| 5,842,194 A * | 11/1998 | Arbuckle | 706/52 |
| 6,009,209 A | 12/1999 | Acker et al. | |
| 6,263,113 B1 * | 7/2001 | Abdel-Mottaleb et al. | 382/237 |
| 6,502,583 B1 | 1/2003 | Utsugi | |
| 6,574,354 B2 * | 6/2003 | Abdel-Mottaleb et al. | 382/118 |
| 7,035,467 B2 * | 4/2006 | Nicponski | 382/224 |
| 7,057,636 B1 * | 6/2006 | Cohen-Solal et al. | 348/14.08 |
| 7,120,279 B2 * | 10/2006 | Chen et al. | 382/118 |
| 7,130,446 B2 * | 10/2006 | Rui et al. | 382/103 |
| 7,430,333 B2 * | 9/2008 | Yu et al. | 382/254 |
| 2002/0071613 A1 | 6/2002 | Ford et al. | |
| 2004/0183914 A1 * | 9/2004 | Silverbrook | 348/207.2 |
| 2005/0232514 A1 * | 10/2005 | Chen | 382/298 |
| 2006/0072811 A1 * | 4/2006 | Porter et al. | 382/159 |
| 2006/0215924 A1 * | 9/2006 | Steinberg et al. | 382/254 |

* cited by examiner

*Primary Examiner*—Daniel G Mariam
*Assistant Examiner*—Aklilu K Woldemariam

(57) ABSTRACT

A method performed by a processing system is provided. The method comprises processing a first plurality of pixel values associated with a first face in a first frame of a digital video to generate a first enhanced pixel value, filtering the first enhanced pixel value to generate a first filtered value, and re-mapping at least the first plurality of pixel values with a first plurality of interpolated values generated from the first enhanced pixel value and the first filtered value.

38 Claims, 4 Drawing Sheets

FACE ENHANCEMENT IN A DIGITAL VIDEO

BACKGROUND

Images are typically captured from a scene using a medium such as film. After processing, the medium may be used to reproduce the images by displaying the images using a display device such as a projector. Unfortunately, the color in the displayed images may not quite match the colors in the scene because of differences in how the colors of the captured images are processed before being displayed. In addition, the aging characteristics of the medium may be such that the medium deteriorates over time or in response to environmental conditions. The deterioration of the medium may cause the color in the displayed images to be altered over time.

Images captured on film using a TechniColor camera provide an example. With the TechniColor camera, the images are captured using a separate filmstrip for the red, blue, and green colors. Because the filmstrips for each color are developed separately, the colors on each filmstrip may develop differently and the final color of the displayed images may be difficult to control. In addition, the filmstrips for each color may deteriorate differently or at different rates over time. As a result, the final color of the displayed images may change over time.

It would be desirable to be able to minimize the color variations in captured images.

SUMMARY

One form of the present invention provides a method performed by a processing system. The method comprises processing a first plurality of pixel values associated with a first face in a first frame of a digital video to generate a first enhanced pixel value, filtering the first enhanced pixel value to generate a first filtered value, and re-mapping at least the first plurality of pixel values with a first plurality of interpolated values generated from the first enhanced pixel value and the first filtered value.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following Detailed Description, therefore, is not to be taken in a limiting sense, and the scope of the present invention is defined by the appended claims.

As described herein, a system and method for generating an enhanced digital video is provided. For each scene in a digital video, the system and method select one or more faces in the scene and process the pixel values of the faces for each frame in the scene. The processed pixel values are filtered and then used to re-map the pixel values for the faces in each frame in the scene. Using the system and method, color variations in the faces that occur from the processing or aging characteristics of the original medium in which the video was captured may be reduced. As a result, the faces in each scene may be enhanced and flicker in the video may be reduced.

Figure 1:
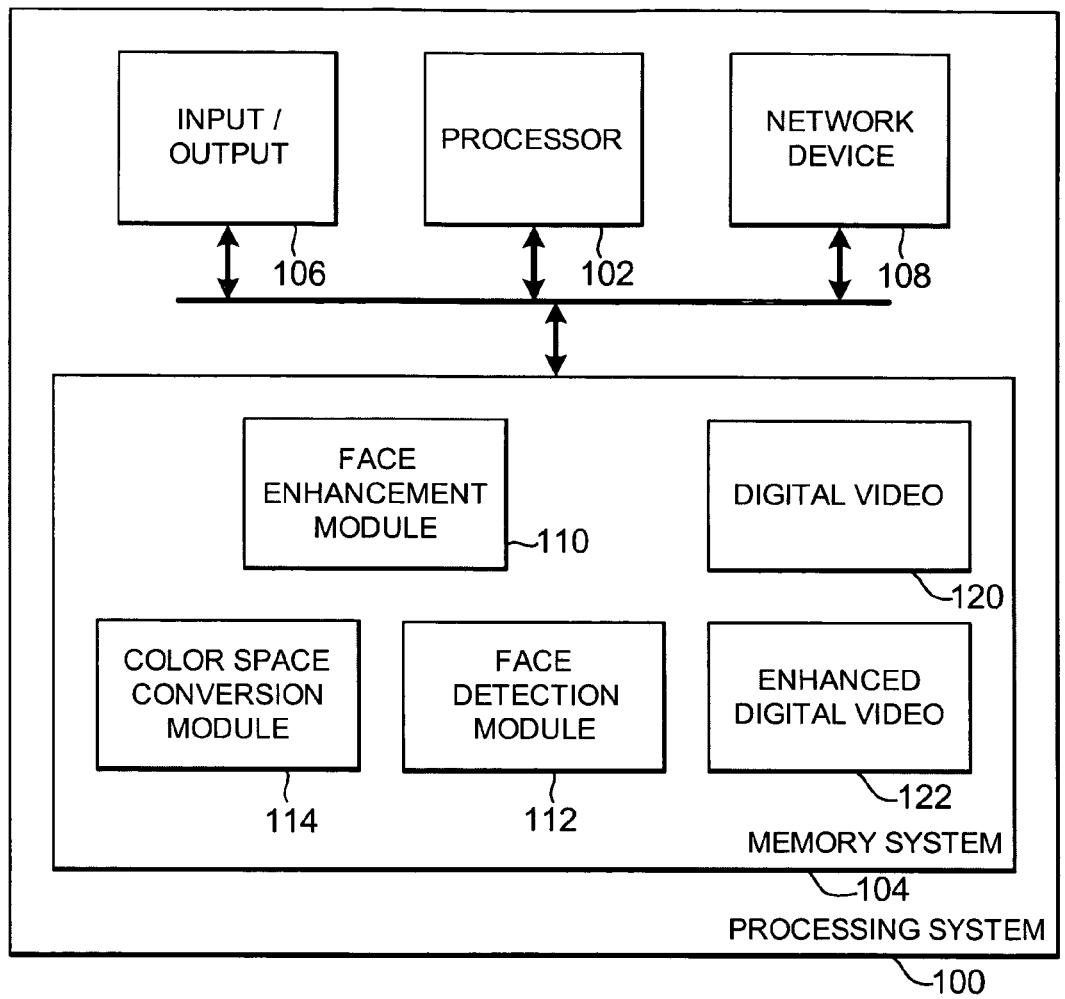
FIG. 1 is a block diagram illustrating a processing system configured to enhance faces in a digital video according to one embodiment of the present invention.

FIG. 1 is a block diagram illustrating a processing system 100 configured to enhance faces in a digital video 120. Processing system 100 comprises a processor 102, a memory system 104, an input/output unit 106, and a network device 108. Memory system 104 is for storing a face enhancement module 110, a face detection module 112, a color space conversion module 114, digital video 120, and an enhanced digital video 122.

Processing system 100 is configured to generate enhanced digital video 122 from digital video 120 using face enhancement module 110, face detection module 112, and, if necessary, color space conversion module 114. Processing system 100 comprises any type of computer system or portable or non-portable electronic device. Example computer systems include desktop, laptop, notebook, workstation, or server computer systems, and examples of electronic devices include digital cameras, digital video cameras, printers, scanners, mobile telephones, and personal digital assistants.

In one embodiment, face enhancement module 110, face detection module 112, and color space conversion module 114 each comprise instructions stored in memory system 104 that are accessible and executable by processor 102. Memory system 104 comprises any number and types of volatile and non-volatile storage devices such as RAM, hard disk drives, CD-ROM drives, and DVD drives. In other embodiments, face enhancement module 110, face detection module 112, and color space conversion module 114 may comprise any combination of hardware and software components configured to perform the functions described herein. Network device 108 may be coupled, directly or indirectly, to any type of wired or wireless local area, wide area, or global communications network.

A user of processing system 100 manages and controls the operation of face enhancement module 110, face detection module 112, and color space conversion module 114 by providing inputs and receiving outputs using input/output unit 106. Input/output unit 106 may comprise any combination of a keyboard, a mouse, a display device, or other input/output device that is coupled, directly or indirectly, to processing system 100.

Face enhancement module 110, face detection module 112, color space conversion module 114, and digital video 120 may each be stored on a medium separate from processing system 100 (not shown) prior to being stored in processing system 100. Examples of such a medium include a hard disk drive, a compact disc (e.g., a CD-ROM, CD-R, or CD-RW), and a digital video disc (e.g., a DVD, DVD-R, or DVD-RW). Processing system 100 may access face enhancement module 110, face detection module 112, color space conversion module 114, and digital video 120 from a remote processing or storage system (not shown) that comprises the medium using network device 108.

Digital video 120 comprises a plurality of digital frames. Each frame may be displayed separately to form an image or in succession, e.g., 24 or 30 frames per second, to form a video (i.e., a set of images that may appear to be moving). Digital video 120 may comprise one or more scenes where a scene comprises a set of related frames. In one embodiment, each frame comprises a red frame with red pixel values, a blue frame with blue pixel values, and a green frame with green pixel values. In other embodiments, each frame may comprise other sets of color frames or may combine the pixel values for each color. Digital video 120 may be generated from a video or other set of images from another medium, e.g., film, or from a camera or other image capture device directly. For example, a TechniColor film captured using a TechniColor camera may be converted into digital video 120 using a scanning process. In other embodiments, digital video 120 may comprise a single image frame or an unrelated set of image frames.

Figure 2:
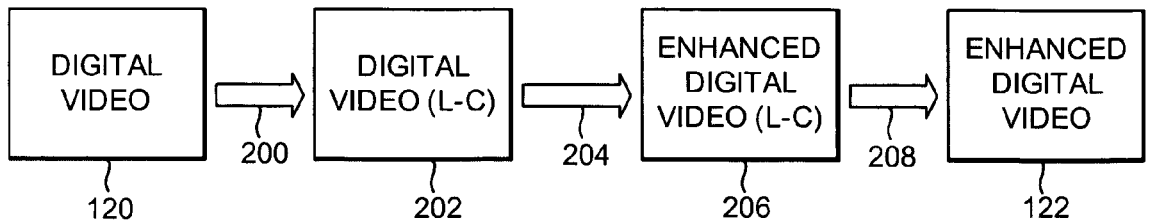
FIG. 2 is a block diagram illustrating a process for enhancing faces in a digital video according to one embodiment of the present invention.

FIG. 2 is a block diagram illustrating a process for enhancing faces in digital video 120. As shown in FIG. 2, processing system 100 executes color space conversion module 114 to convert digital video 120 from a first color space, e.g., an RGB color space, to a second color space, e.g., a luminance-chrominance (L-C) color space such as CIELAB (Lab), YCC, YCrCb, YUV, or LUV, to generate digital video (L-C) 202 as indicated by an arrow 200.

In the RGB color space, each frame of digital video 120 comprises red, green, and blue pixel values for each pixel location. The red, green, and blue pixel values are combined during the display of digital video 120 to reproduce the images of digital video 120. With an L-C color space, each frame of digital video 120 comprises a luminance and one or more chrominance pixel values for each pixel location. The luminance and chrominance pixel values are combined during the display of digital video 120 to reproduce the images of digital video 120. In some embodiments, digital video 120 may comprise an L-C color space. Accordingly, the conversion of digital video 120 using color space conversion module 114 may be omitted in these embodiments.

Processing system 100 executes face enhancement module 110 and face detection module 112 to generate enhanced digital video 206 in the L-C color space from digital video 202 as indicated by an arrow 204. Processing system 100 selects faces for enhancement in digital video 120 using face detection module 112. Using face enhancement module 110, processing system 100 causes the color of the selected faces in enhanced digital video 206 to be enhanced from that in digital video 202 as will described in additional detail below.

After generating the enhanced digital video 206, processing system 100 executes color space conversion module 114 to convert enhanced digital video 206 from the second color space, e.g., an L-C color space, to the first color space, e.g., the RGB color space, to generate enhanced digital video 122 as indicated by an arrow 208. In some embodiments, the conversion of enhanced digital video 206 using color space conversion module 114 may be omitted.

In other embodiments, processing system 100 executes face enhancement module 110 and face detection module 112 to generate enhanced digital video 122 in the RGB color space from digital video 120.

Additional details of generating enhanced digital video 122 will now be described.

Figure 3A:
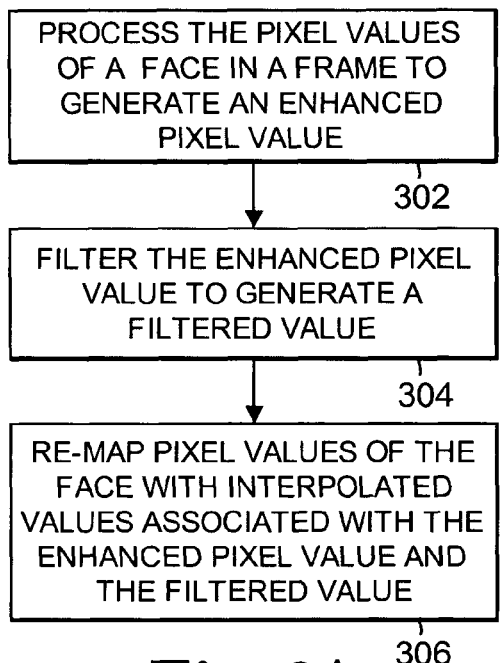
FIG. 3A is a flow chart illustrating a method for enhancing faces in a digital video according to embodiments of the present invention.

FIG. 3A is a flow chart illustrating a method for enhancing faces in digital video 120. The method may be performed by processing system 100 using face enhancement module 110, face detection module 112, and, if necessary, color space conversion module 114.

In FIG. 3A, processing system 100 processes the pixel values of a face in a frame of digital video 120 to generate an enhanced pixel value as indicated in a block 302. Processing system 100 filters the enhanced pixel value to generate a filtered value as indicated in a block 304. Processing system 100 re-maps the pixel values of the face with interpolated values associated with the enhanced pixel value and the filtered value as indicated in a block 306.

Figure 3B:
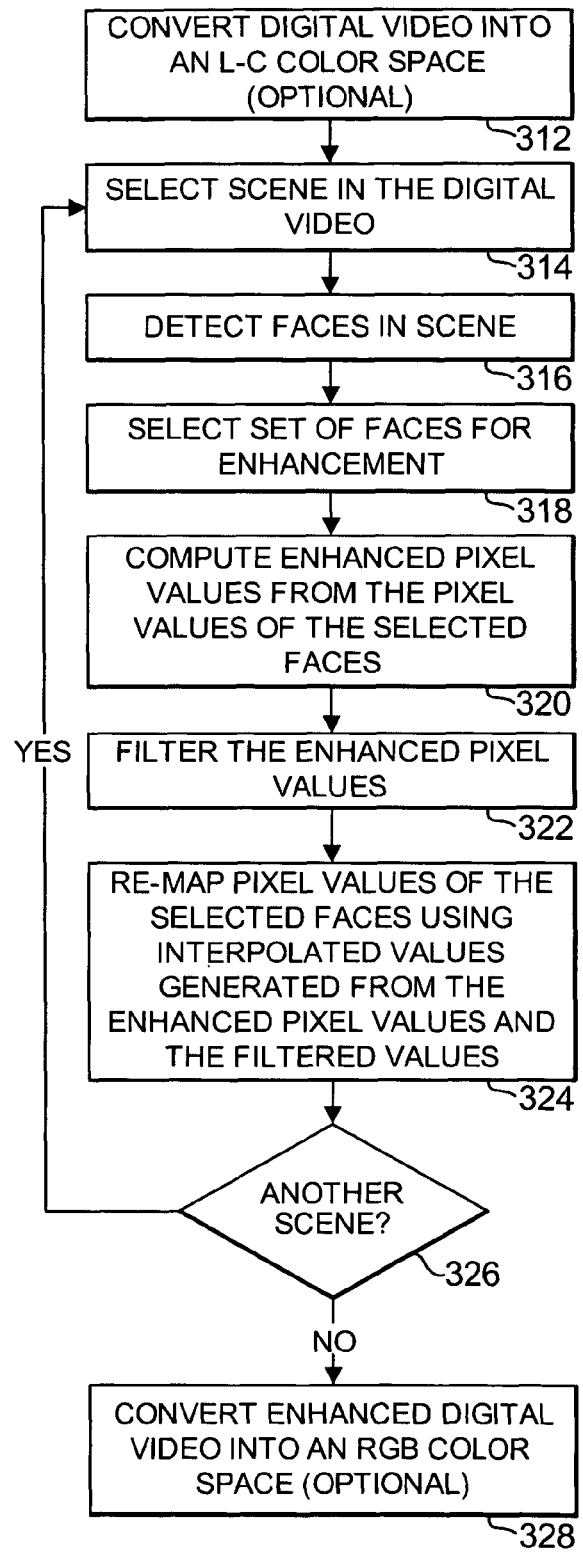
FIG. 3B is a flow chart illustrating a method for enhancing faces in a digital video according to embodiments of the present invention.

FIG. 3B is a flow chart illustrating a method for enhancing faces in digital video 120. The method may be performed by processing system 100 using face enhancement module 110, face detection module 112, and, if necessary, color space conversion module 114.

In FIG. 3, processing system 100 optionally converts digital video 120 into a luminance-chrominance (L-C) color space using color space conversion module 114 as indicated in a block 312. For example, processing system 100 converts digital video 120 from the RGB color space to the CIELAB color space to generate digital video 202. The function of block 312 may be omitted in embodiments where digital video 120 is in the CIELAB or other L-C color space and in embodiments where processing system 100 generates enhanced digital video 122 in the RGB space using digital video 120.

Processing system 100 selects a scene in digital video 202 as indicated in a block 314. In one embodiment, processing system 100 selects the scene automatically by detecting continuity and/or changes between frames in digital video 202. In other embodiments, processing system 100 selects the scene in response to a user input where the user identifies the scene.

Processing system 100 detects faces in the scene using face detection module 112 as indicated in a block 316. Face detection module 112 comprises any suitable face detection algorithm configured to detect one or more faces in the scene and identify the location of the one or more faces in each frame. Additional information regarding face detection algorithms is taught by Viola, P. and Jones, M. in Rapid object detection using a boosted cascade of simple features, Computer Vision and Pattern Recognition, 2001, CVPR 2001, Proceedings of the 2001 IEEE Computer Society Conference on, Volume: 1, 8-14 Dec. 2001 Pages: I-511-I-518 vol. 1. Face detection module 112 may incorporate any of the face detection algorithms taught or referenced by Viola and Jones, for example.

Processing system 100 selects a set of faces for enhancement using face detection module 112 as indicated in a block 318. The set may comprise all of the faces in the scene or one or more faces in the scene that meet predetermined criteria, e.g., size, sharpness, and/or brightness. In one embodiment described in additional detail below with reference to FIG. 5, face enhancement module 110 selects a dominant face in the scene according to one or more predefined characteristics. The characteristics may include size (e.g., the largest face in the scene), sharpness (e.g., the sharpest face in the scene), brightness (e.g., the brightest face in the scene), and facial movements (e.g., whether the person is talking). In other embodiments, face detection module 112 selects more than one face in the scene. The faces selected may include all or less than all of the detected faces in the scene.

Processing system 100 computes an enhanced pixel value from the pixel values of the selected faces for each frame in the scene using face enhancement module 110 as indicated in a block 320. More particularly, processing system 100 extracts the pixel values from the selected face regions in each frame and processes the pixel values to generate the enhanced pixel values. In one embodiment, processing system 100 performs processing on the chrominance pixels of the selected faces, particularly where the pixel values comprise L-C color space values. In other embodiments, processing system 100 performs processing on the RGB pixel values of the selected faces.

In one embodiment, processing system 100 generates enhanced chrominance pixel values by averaging the chrominance pixel values for each frame. In another embodiment, processing system 100 generates enhanced chrominance pixel values by calculating median of the chrominance pixel values for each frame. In a further embodiment, processing system 100 generates the enhanced chrominance pixel values by excluding extreme chrominance pixel values and averaging the remaining chrominance pixel values.

Processing system 100 filters the enhanced pixel values using face enhancement module 110 as indicated in a block 322. Processing system 100 filters the enhanced pixel values to smooth variances and extreme values of the enhanced pixel values.

Figure 4:
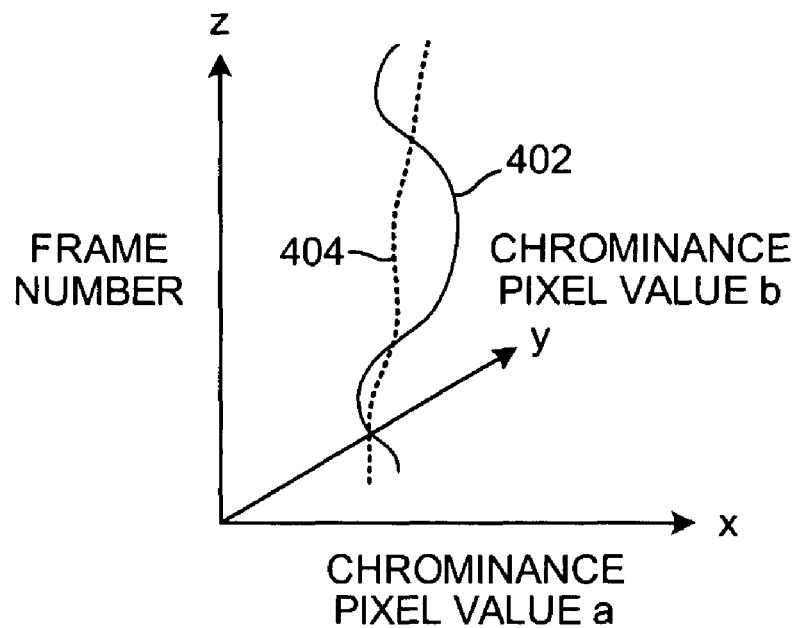
FIG. 4 is a graph illustrating filtering enhanced pixel values according to embodiments of the present invention.

FIG. 4 is a graph illustrating filtering enhanced pixel values. In FIG. 4, the enhanced pixel values are represented in the CIELAB color space. In the CIELAB color space, the a and b values comprise the chrominance pixel values and the L value (not shown) comprises the luminance pixel values. The chrominance pixel value a is represented along the x-axis, and the chrominance pixel value b is represented along the y-axis. The z-axis represents the frame number.

Solid line 402 is a graph of the enhanced pixel values for each frame prior to being filtered by face enhancement module 110. Dotted line 404 is graph of the filtered values for each frame as filtered from the enhanced pixel values by face enhancement module 110. As shown by graphs 402 and 404, the filtered values smooth variances and extreme values of the enhanced pixel values.

Processing system 100 re-maps the pixel values of the selected faces using interpolated values generated from the enhanced pixel values and the filtered values using face enhancement module 110 to generate enhanced digital video 206 as indicated in a block 324. For each frame in a scene, processing system 100 replaces the pixel values in the selected face regions in a frame with interpolated values generated from the enhanced pixel value and the filtered value for that frame. In one embodiment, the interpolated values comprise a look-up table generated from the enhanced pixel value and the filtered value for that frame. In other embodiments, the interpolated values are generated from the enhanced pixel value and the filtered value in other ways. In one embodiment, processing system 100 replaces only the pixel values in the selected face regions in a frame with the interpolated values. In other embodiments, processing system 100 replaces all of the pixel values in the frame with interpolated values generated from the enhanced pixel value and the filtered value for that frame.

Figure 5:
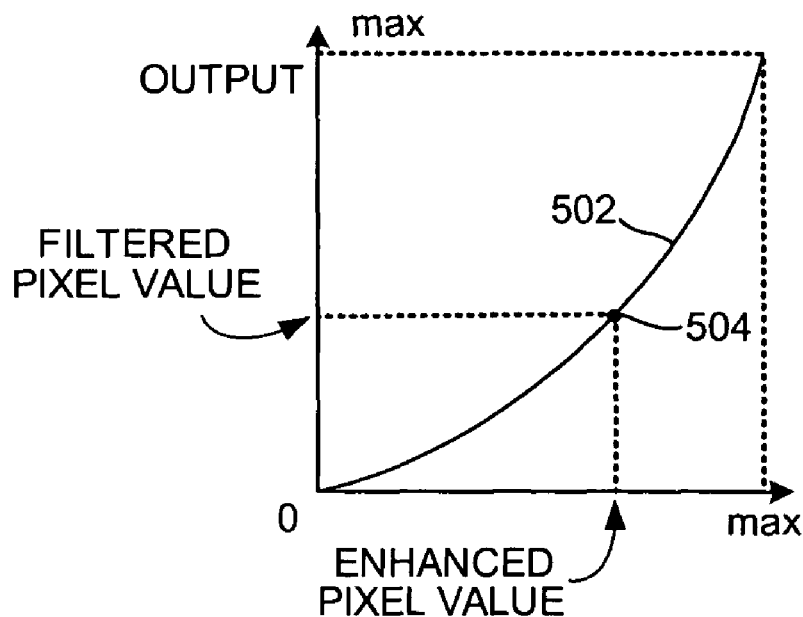
FIG. 5 is a graph illustrating interpolated pixel values according to embodiments of the present invention.

FIG. 5 is a graph illustrating interpolated pixel values. Once the processed pixel values are calculated and filtered, processing system 100 re-maps the face region of the selected faces using a look-up table (not shown). The look-up table is constructed for each frame with a smooth curve 502 passing through the data point 504 where the enhanced pixel value and the filtered value intersect.

A determination is made by processing system 100 as to whether there is another scene to enhance as indicated in a block 326. In one embodiment, processing system 100 makes the determination automatically by detecting another scene in digital video 202. In other embodiments, processing system 100 makes the determination in response to a user input where the user indicates whether there is another scene to enhance. If there is another scene to enhance, then processing system 100 repeats the functions of blocks 314 through 326.

If there is not another scene to enhance, then processing system 100 optionally converts enhanced digital video 206 into an RGB color space using color space conversion module 114 to generate enhanced digital video 122 as indicated in a block 328. In one embodiment, for example, processing system 100 converts enhanced digital video 206 from the CIELAB color space to the RGB color space to generate enhanced digital video 122. The function of block 318 may be omitted in embodiments where the desired color space for enhanced digital video 122 is in the CIELAB or other L-C color space used in generating enhanced digital video 206 and in embodiments where processing system 100 generates enhanced digital video 122 directly from the RGB color space.

Figure 6:
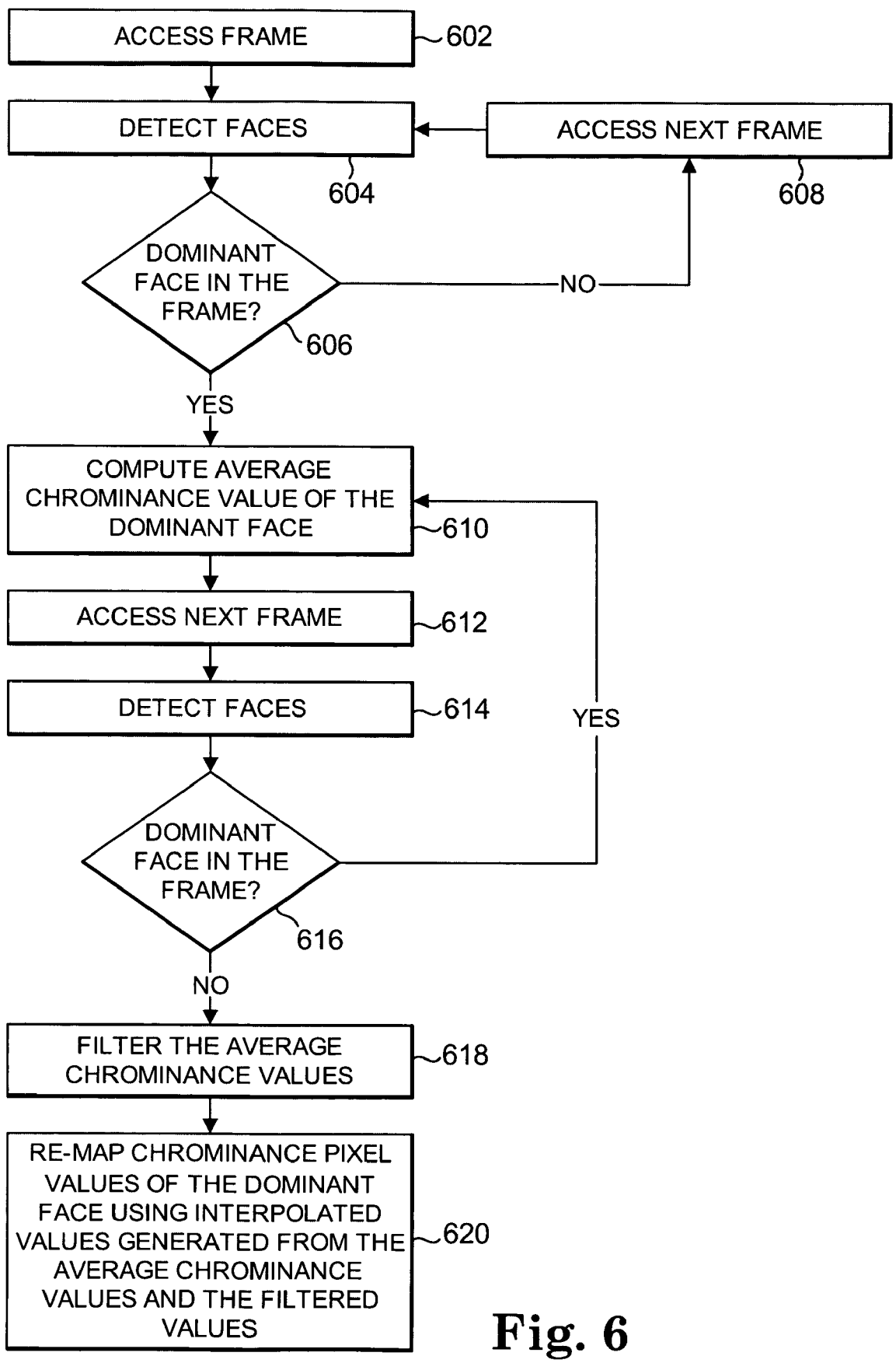
FIG. 6 is a flow chart illustrating a method for enhancing a dominant face in a digital video according to embodiments of the present invention.

FIG. 6 is a flow chart illustrating a method for enhancing a dominant face in digital video 202. The method may be performed by processing system 100 using face enhancement module 110 and face detection module 112.

In FIG. 6, processing system 100 accesses a frame in digital video 202 in memory system 104 as indicated in a block 602. Processing system 100 detects faces in the frame using face detection module 112 as indicated in a block 604.

A determination is made by processing system 100 as to whether there is a dominant face in the frame using face enhancement module 110 as indicated in a block 606. Face enhancement module 110 selects a dominant face in the frame according to one or more predefined characteristics. The characteristics may include size (e.g., the largest face in the frame), sharpness (e.g., the sharpest face in the frame), brightness (e.g., the brightest face in the frame), and facial movements (e.g., whether the person is talking).

If there is not a dominant face in the frame, then processing system 100 accesses the next frame as indicated in a block 608 and repeats the functions of blocks 604 and 606 for that frame.

If there is a dominant face in the frame, then a scene with a dominant face begins and processing system 100 computes the average chrominance values of the dominant face in the frame as indicated in a block 610. More particularly, processing system 100 extracts the chrominance pixel values from the dominant face region in the frame and averages the chrominance pixel values.

Processing system 100 accesses the next frame as indicated in a block 612. Processing system 100 detects faces in the frame using face detection module 112 as indicated in a block 614. A determination is made by processing system 100 as to whether there is a dominant face in the frame using face enhancement module 110 as indicated in a block 616. If there is a dominant face in the frame, then processing system 100 repeats the functions of blocks 610 through 616. If there is not a dominant face in the frame, then the scene with the dominant face ends and processing system 100 filters the average chrominance values as indicated in a block 618 and re-maps the chrominance pixel values of the dominant face using interpolated values generated from the average chrominance values and the filtered values as indicated in a block 620 as described above with reference to FIG. 3. For each frame in the scene, processing system 100 replaces each of the pixel values in the dominant face in a frame with interpolated values from a look-up table for that frame. In other embodiments, processing system 100 replaces all of the pixel values in the frame with the interpolated values from the look-up table for that frame.

Using the system and method described above, color variations of faces in a digital video caused by processing or aging characteristics of the original medium in which the video was captured may be reduced. Accordingly, the faces in each scene may be enhanced and flicker in the video may be reduced.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A method performed by a processing system, the method comprising:
   processing a first plurality of pixel values of a first face in a first frame of a digital video to generate a first enhanced pixel value using the processing system;
   processing a second plurality of pixel values of the first face in a second frame of the digital video to generate a second enhanced pixel value using the processing system;
   filtering the first enhanced pixel value and the second enhanced pixel value to generate a first filtered value using the processing system; and
   re-mapping at least the first plurality of pixel values with a first plurality of interpolated values generated from the first enhanced pixel value and the first filtered value using the processing system.

2. The method of claim 1 further comprising:
   filtering the first enhanced pixel value and the second enhanced pixel value to generate a second filtered value using the processing system; and
   re-mapping the second plurality of pixel values with a second plurality of interpolated values generated from the second enhanced pixel value and the second filtered value using the processing system.

3. The method of claim 2 wherein the first frame and the second frame comprise a scene.

4. The method of claim 1 further comprising:
   detecting the first face in the first frame prior to processing the first plurality of pixel values using the processing system.

5. The method of claim 4 further comprising:
   determining that the first face in the first frame comprises a dominant face according to one or more predefined characteristics using the processing system.

6. The method of claim 5 wherein at least one of the predefined characteristics is selected from the group consisting of size, sharpness, brightness, and facial movement.

7. The method of claim 1 further comprising:
   processing the first plurality of pixel values of the first face in the first frame of the digital video and a third plurality of pixel values of a second face in the first frame of the digital video to generate the first enhanced pixel value using the processing system; and
   re-mapping the first plurality of pixel values and the third plurality of pixel values with the first plurality of interpolated values using the processing system.

8. The method of claim 7 further comprising:
   processing the second plurality of pixel values of the first face in the second frame of the digital video and a fourth plurality of pixel values of the second face in the second frame of the digital video to generate the second enhanced pixel value using the processing system;
   filtering the first enhanced pixel value and the second enhanced pixel value to generate a second filtered value using the processing system; and
   re-mapping the second plurality of pixel values and the fourth plurality of pixel values with a second plurality of interpolated values generated from the second enhanced pixel value and the second filtered value using the processing system.

9. The method of claim 1 further comprising:
   processing the first plurality of pixel values to generate the first enhanced pixel value by averaging the first plurality of pixel values using the processing system.

10. The method of claim 1 further comprising:
    processing the first plurality of pixel values to generate the first enhanced pixel value by computing a median of the first plurality of pixel values using the processing system.

11. The method of claim 1 further comprising:
    processing the first plurality of pixel values to generate the first enhanced pixel value by excluding an extreme value of the first plurality of pixel values and computing a mean using the first plurality of pixel values using the processing system.

12. The method of claim 1 further comprising:
    converting the digital video from a first color space to a second color space prior to processing the first plurality of pixel values using the processing system.

13. The method of claim 12 wherein the first color space comprises an RGB color space, and wherein the second color space comprises a CIELAB color space.

14. The method of claim 1 further comprising:
    converting the digital video from a first color space to a second color space subsequent to re-mapping the first plurality of pixel values using the processing system.

15. The method of claim 14 wherein the first color space comprises a CIELAB color space, and wherein the second color space comprises an RGB color space.

16. A system comprising:
    a processor; and
    a memory system for storing a digital video and a face enhancement module;
    wherein the processor is configured to execute the face enhancement module to:
    process a first plurality of pixel values of a first face in a first frame of the digital video to generate a first enhanced pixel value;
    process a second plurality of pixel values of the first face in a second frame of the digital video to generate a second enhanced pixel value;
    filter the first enhanced pixel value and the second enhanced pixel value to generate a first filtered value; and
    re-map at least the first plurality of pixel values with a first plurality of interpolated values generated from the first enhanced pixel value and the first filtered value.

17. The system of claim 16 wherein the processor is configured to execute the face enhancement module to:
    detect a beginning of a scene; and
    process the first plurality of pixel values in response to detecting the beginning of the scene.

18. The system of claim 17 wherein the processor is configured to execute the face enhancement module to:
    filter the first enhanced pixel value and the second enhanced pixel value to generate a second filtered value; and
    re-map the second plurality of pixel values with a second plurality of interpolated values generated from the second enhanced pixel value and the second filtered value.

19. The system of claim 18 wherein the processor is configured to execute the face enhancement module to:
   detect an end of the scene subsequent to processing the second plurality of pixel values.

20. The system of claim 19 wherein the first frame and the second frame comprise the scene.

21. The system of claim 16 wherein the processor is configured to execute the face enhancement module to:
   detect the first face in the first frame prior to processing the first plurality of pixel values.

22. The system of claim 21 wherein the processor is configured to execute the face enhancement module to:
   determine that the first face in the first frame comprises a dominant face according to one or more predefined characteristics.

23. The system of claim 22 wherein at least one of the predefined characteristics is selected from the group consisting of size, sharpness, brightness, and facial movement.

24. The system of claim 16 wherein the processor is configured to execute the face enhancement module to:
   process the first plurality of pixel values of the first face in the first frame of the digital video and a third plurality of pixel values of a second face in the first frame of the digital video to generate the first enhanced pixel value; and
   re-map the first plurality of pixel values and the third plurality of pixel values with the first plurality of interpolated values.

25. The system of claim 24 wherein the processor is configured to execute the face enhancement module to:
   process the second plurality of pixel values of the first face in the second frame of the digital video and a fourth plurality of pixel values of the second face in the second frame of the digital video to generate the second enhanced pixel value;
   filter the first enhanced pixel value and the second enhanced pixel value to generate a second filtered value; and
   re-map the second plurality of pixel values and the fourth plurality of pixel values with a second plurality of interpolated values generated from the second enhanced pixel value and the second filtered value.

26. The system of claim 16 wherein the processor is configured to execute the face enhancement module to:
   process the first plurality of pixel values to generate the first enhanced pixel value by averaging the first plurality of pixel values.

27. The system of claim 16 wherein the processor is configured to execute the face enhancement module to:
   process the first plurality of pixel values to generate the first enhanced pixel value by computing a median of the first plurality of pixel values.

28. The system of claim 16 wherein the processor is configured to execute the face enhancement module to:
   process the first plurality of pixel values to generate the first enhanced pixel value by excluding an extreme value of the first plurality of pixel values and computing a mean using the first plurality of pixel values.

29. The system of claim 16 wherein the processor is configured to execute the face enhancement module to:
   convert the digital video from a first color space to a second color space prior to processing the first plurality of pixel values.

30. The system of claim 16 wherein the processor is configured to execute the face enhancement module to:
   convert the digital video from a first color space to a second color space subsequent to re-mapping the first plurality of pixel values.

31. A system comprising:
   means for processing a first plurality of pixel values of a set of faces in a first frame of a digital video to generate a first enhanced pixel value;
   means for processing a second plurality of pixel values of the set of faces in a second frame of the digital video to generate a second enhanced pixel value;
   means for filtering the first enhanced pixel value and the second enhanced pixel value to generate a first filtered value; and
   means for re-mapping at least the first plurality of pixel values with a first plurality of interpolated values generated from the first enhanced pixel value and the first filtered value.

32. The system of claim 31 further comprising:
   means for filtering the first enhanced pixel value and the second enhanced pixel value to generate a second filtered value; and
   re-mapping the second plurality of pixel values with a second plurality of interpolated values generated from the second enhanced pixel value and the second filtered value.

33. The system of claim 32 wherein the first frame and the second frame comprise a scene.

34. The system of claim 31 further comprising:
   means for detecting the set of faces in the first frame prior to processing the first plurality of pixel values.

35. A non-transitory computer-readable medium including instructions executable by a processing system for performing a method comprising:
   processing a first plurality of pixel values of a set of faces in a first frame of a digital video to generate a first enhanced pixel value;
   processing a second plurality of pixel values of the first face in a second frame of the digital video to generate a second enhanced pixel value;
   filtering the first enhanced pixel value and the second enhanced pixel value to generate a first filtered value; and
   re-mapping at least the first plurality of pixel values with a first plurality of interpolated values generated from the first enhanced pixel value and the first filtered value.

36. The non-transitory computer-readable medium of claim 35 including instructions executable by the processing system for performing the method comprising:
   detecting a beginning of a scene; and
   processing the first plurality of pixel values in response to detecting the beginning of the scene.

37. The non-transitory computer-readable medium of claim 36 including instructions executable by the processing system for performing the method comprising:
   filtering the first enhanced pixel value and the second enhanced pixel value to generate a second filtered value; and
   re-mapping the second plurality of pixel values with a second plurality of interpolated values generated from the second enhanced pixel value and the second filtered value.

38. The non-transitory computer-readable medium of claim 37 including instructions executable by the processing system for performing the method comprising:
   detecting an end of the scene subsequent to processing the second plurality of pixel values.

* * * * *